United States Patent
Hoang et al.

(10) Patent No.: US 12,014,469 B2
(45) Date of Patent: Jun. 18, 2024

(54) SYSTEM AND METHOD FOR RECONSTRUCTING A 3D HUMAN BODY FROM ANTHROPOMETRIC MEASUREMENTS

(71) Applicant: VIETTEL GROUP, Ha Noi (VN)

(72) Inventors: Ngoc Thach Hoang, Ninh Binh (VN); Tien Dat Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 270 days.

(21) Appl. No.: 17/568,347

(22) Filed: Jan. 4, 2022

(65) Prior Publication Data
US 2023/0005231 A1    Jan. 5, 2023

(30) Foreign Application Priority Data
Jul. 2, 2021 (VN) .............................. 1-2021-04086

(51) Int. Cl.
*G06T 19/20*    (2011.01)
*G06T 17/20*    (2006.01)

(52) U.S. Cl.
CPC .............. *G06T 19/20* (2013.01); *G06T 17/20* (2013.01); *G06F 2218/02* (2023.01); *G06T 2210/41* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 10,321,728 B1* | 6/2019 | Koh | G06T 7/11 |
| 2010/0111370 A1* | 5/2010 | Black | G06F 18/2321 |
| | | | 705/26.1 |
| 2014/0168217 A1* | 6/2014 | Kim | G06T 19/20 |
| | | | 345/420 |
| 2014/0333614 A1* | 11/2014 | Black | G06T 17/00 |
| | | | 345/419 |
| 2017/0156430 A1* | 6/2017 | Karavaev | G06Q 30/0643 |

OTHER PUBLICATIONS

Yuzhe Zhang, Jianmin Zheng, Nadia Magnenat-Thalmann, "Example-guided anthropometric human body modeling", Oct. 17, 2014, Springer, The Visual Computer, vol. 31, pp. 1615-11631.*

(Continued)

*Primary Examiner* — Robert Bader
(74) *Attorney, Agent, or Firm* — patenttm.us

(57) ABSTRACT

The Invention presents a system and a method for digitizing a human body shape from anthropometrical measurements. The proposed system and method allow reconstructing the 3D human body quickly and accurately, improving disadvantages of costly and timely traditional methods, which not only requires digitized persons to be naked or wear tight clothes but also could use hazardous lights to their health. The system in the invention includes two main modules and two supplementary blocks to reconstruct the 3D human body from anthropometric measurements, which are: (1) Input Block, (2) Pre-Processing Module, (3) Optimization Module, (4) Output Block. The method in the invention includes four steps: (1) Step 1a: collecting human body measurements, (2) Steps 1b: Initial Population; (3) Step 2: Optimizing; (4) Step 3: Displaying digitized human body shape.

4 Claims, 3 Drawing Sheets

(56) References Cited

OTHER PUBLICATIONS

Mustafa Kasap, Nadia Magnenat-Thalmann, "Parameterized Human Body Model for Real-Time Applications", Oct. 26, 2007, IEEE, 2007 International Conference on Cyberworlds (CW'07).*

Nurbiya Yadikar, Shujing Zhang, Hornisa Mamat, Mutallip Mamut, Kurban Ubul, "Estimation of Body Size by Combining Genetic Algorithm with Human Body Model", Apr. 2017, Atlantic Press, Proceedings of the 2017 2nd International Conference on Electrical, Automation and Mechanical Engineering (EAME 2017).*

Changbo Hu, Qingfeng Yu, Yi Li, Songde Ma, "Extraction of Human Model for Posture Recognition Using Genetic Algorithm", Mar. 30, 2000, IEEE, Proceedings of the Fourth IEEE International Conference on Automatic Face and Gesture Recognition.*

Hoang Ngoc Thach, Nguyen Tien Dat, "3D Reconstruction Human Body From Anthropometric Measurements Using Diversity Control Oriented Genetic Algorithm", Jun. 21, 2021, Mendel, Soft Computing Journal, vol. 27, No. 1.*

* cited by examiner

SYSTEM AND METHOD FOR RECONSTRUCTING A 3D HUMAN BODY FROM ANTHROPOMETRIC MEASUREMENTS

FIELD OF THE INVENTION

The invention relates to a system and a method for digitizing the human body from anthropometric measurements applied in the fields of modeling and simulation.

BACKGROUND

In recent technologies, 3D human reconstruction has been extensively used in different industries, attracted great research interests. Generally, there are two main approaches frequently used to digitalize the 3D human model: (1) Scan3D method and (2) Machine Learning method.

In the Scan3D method, 3D scanning systems adopt technologies such as (1) Photogrammetry, (2) Laser Triangulation, (3) Structured Light to create a 3D version of the human body. In particular: (1) Photogrammetry uses a multi-camera system to take overlapping photos of an object from different angles to capture every aspect of the object. These photos are then imported to photogrammetry software and reconstructed into 3D models by computational algorithms. (2) Laser Triangulation is the second 3D scan method, projecting a laser beam onto the surface of an object, measuring the deformation of the laser light and the distance from the object to the scanner. When collecting enough distances, the object's surface will be mapped to recreate its 3D version. (3) Structured light applies a similar principle as (2) but does not rely on the laser beam, instead it employs projected light patterns and a multiple-camera system to capture images of an object. After that, 3D scanning software is used to calculate the object's depth and surface information, resulting in a 3D model of the object.

In the Machine Learning method, RGB images of the digitized person are taken and then processed by image processing techniques in machine learning to simulate the human body model. There are several approaches to this method as follows: (1) an RGB image of the digitized person is taken to estimate the 3D pose and shape of the human body with a parametric human model whose joint locations are detected. A Convolutional Neutral Network is used to predict 2D joint locations, then an objective function is applied to penalizes the error between detected 2D joint locations and projected 3D model joints, (2) still applies the Convolutional Neutral Network to predict regressed shape parameters but combines with an optimization-based method to initialize an iterative optimization, producing a higher accuracy in pose estimation, (3) uses an image and adds a model called "skin-cloth", which defines skin contours and clothed contours to provide information for the optimization process.

An overview of the traditional methods model is shown in FIG. 1.

Although having reached several outcomes such as accuracy, traditional methods also come with many drawbacks. Firstly, in the Scan3D methods, the lighting source pointing onto the human body could be harmful to human health. Secondly, 3D scanners using Laser or Structured Light incur an extremely high initial cost (the machinery can cost $5,000 to $100,000), which is not affordable for daily usage. Thirdly, Photogrammetry, while costing less than the above technologies but often involves more in-office processing time, which can be 8-12 hours. Similarly, when applying Laser Triangulation technology, point clouds obtained after scanning need to be processed by specialized software to create the 3D model. Finally yet importantly, to reconstruct an accurate human body model, both Scan3D method and Machine Learning method often require the digitized person to take off or wear tight clothes. This, firstly, is sensitive in terms of the rights of an individual concerning his/her image, causing discomfort for the digitized person; secondly, a preparation process of taking off/wearing standard clothes to capture images is time-consuming and mainly suitable in the laboratory environment. Applying optimization methods combining with machine learning techniques could address the above problems and receive considerable benefits: speed up model processing time, reduce implementation costs and protect human health. Moreover, a 3D reconstruction method using only the user's anthropometric measurements without any requirements of clothes is necessary for practical applications.

SUMMARY OF THE INVENTION

The first purpose of the invention is to propose a system for digitalizing the human body shape using anthropometric measurements. The proposed system includes two main modules: (1) Pre-processing Module, (2) Optimization Module and two supplementary blocks: (1) Input Block, (2) Output Block. In particular:

The Input Block collects anthropometric measurements entered actively by users;

The Pre-Processing Module consists of two blocks: Data Generating Block; Data Clustering Block. In which, the Data Generating Block is responsible for generating 50000 data sets of human body parameters; the Data Clustering Block is responsible for separating the data sets into clusters containing anthropometrically similar data;

The Optimization Module consists of two blocks: Calculating Block aims to calculate measurements of the parametric and Optimizing Block for optimizing the parameters. In which, the Calculating Block is accountable for determining measurements of the parametric model generated from shapes dataset equivalent to anthropometric measurements entered by the user; the Optimizing Block is accountable for iteratively finding an optimal value of the shapes dataset through defined loops;

The Output Block is responsible for displaying the human body in the form of a mesh model file (.obj) conforming to rules on the number of model polygons and model vertices.

The second purpose of the invention is to propose a method for digitalizing the human body shape from anthropometric measurements using Machine Learning techniques and Diversity Control Oriented Genetic Algorithm. For this purpose, the proposed method includes four steps:

Step 1a: Collecting anthropometric measurements: collecting body's measurements entered by the user. The Pre-processing Block collects anthropometric measurements entered by the user in the Input Block. These measurements are then passed to the Optimization Module in Step 2. Step 1a is implemented on the Pre-processing Module.

Step 1b: Initial Population: In this step, the solution space for the shape parameter values of the parametric model will be selectively initialized and clustered in the Pre-processing Module based on the human body shape analysis.

Step 2: Optimizing the shape parameters: In this step, the Optimization Module has responsibility for combining the anthropometric measurements entered by the user in Step 1a with measurements defined and clustered by the Calculating Block in Step 1b to perform natural selection and reproduction process.

Step 3: displaying digitized human body model. This step is implemented in the Output Block, the digitized human body model is displayed on device screens such as a computer screen, a projector screen, ending the digitizing process of the human body under clothing and completing the stated purpose.

DETAILED DESCRIPTION OF THE INVENTION

Figure 1:
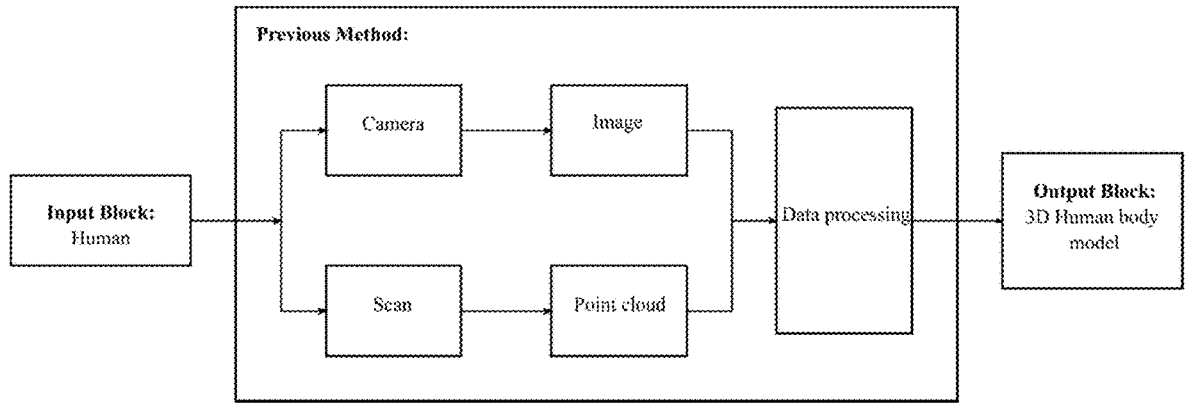
FIG. 1 is a block diagram illustrating the 3D human reconstruction process in traditional methods.
Figure 2:
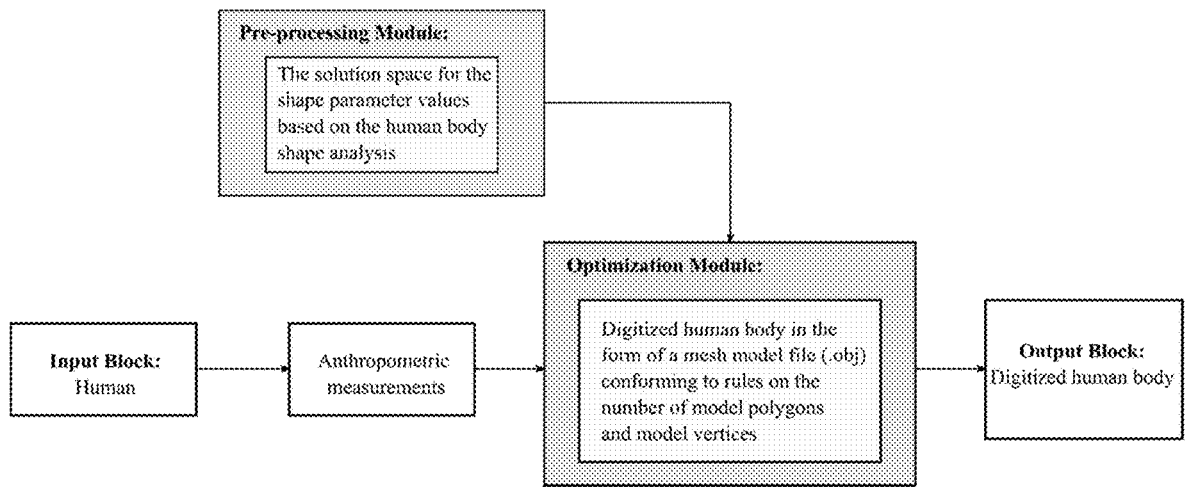
FIG. 2 is a block diagram illustrating the 3D human reconstruction process in the invention.

As shown in FIG. 1 and FIG. 2, the invention refers to a system and method for digitizing the human body from anthropometric measurements which use optimization algorithms instead of traditional methods such as 3D Scanners or image processing techniques.

In this invention, the following terms are construed as follows:

"Digitized human body model" is data that uses rules of mesh points, mesh surfaces to represent a three-dimension shape of a real person's body shape. That means all shape sizes are preserved from the real body. This data is saved as 3D model in the obj file extension, which is an object storage format.

"Genetic Algorithm" is a class of Heuristic optimization algorithm which mimics the evolutionary processes in nature such as reproduction or natural selection;

"Diversity Control Oriented Genetic Algorithm" is a variant of the Genetic Algorithm;

"Anthropometric measurements" are quantitative indicators of specific measurements of the human body such as bust circumference, waist circumference, leg length, back length;

"Human parametric model" is a model that could be transformed into different shapes based on parameters controlling the shape and parameters controlling the pose, the 3D human body model after being transformed has to comply with rules of the number of mesh points and the position of mesh surface compared to the original model.

FIG. 2 indicates the difference between the proposed system and the traditional one: the former employs anthropometric measurements entered by the user through two main modules: Pre-processing Module and Optimization Module. In which:

The Pre-processing Module has the function of initializing a dataset of the 3D human body, clustering the dataset based on the shape of each model and background of anthropometric measurements. Data clusters, also known as population, will be used as the solution space for the Optimization Module, responsible for generating 3D human body satisfying the measurement information on the human body.

Figure 3:
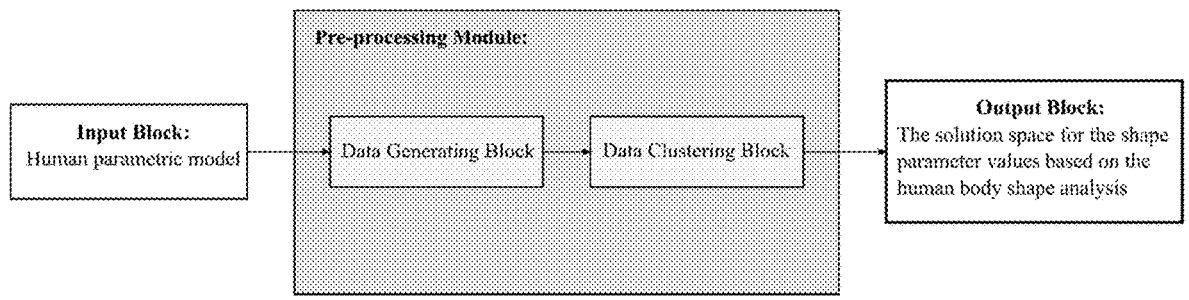
FIG. 3 illustrates the Pre-processing Module.

Referring to FIG. 3, the Pre-processing Module has a task for clustering the dataset to make the solution space for the Optimization Module; the Pre-processing Module includes two main blocks: Data Generating Block and Data Clustering Block. In particular:

The Data Generating Block uses the human parametric model for a synthetic data with shape parameter values in the range of [−3;3] to ensure shapes in nature create the solution space for optimizing the real model. The Data Clustering Block separates the randomly generated values into anthropometrically identical clusters, used as input anthropometric measurements to the Optimization Module.

Figure 4A:
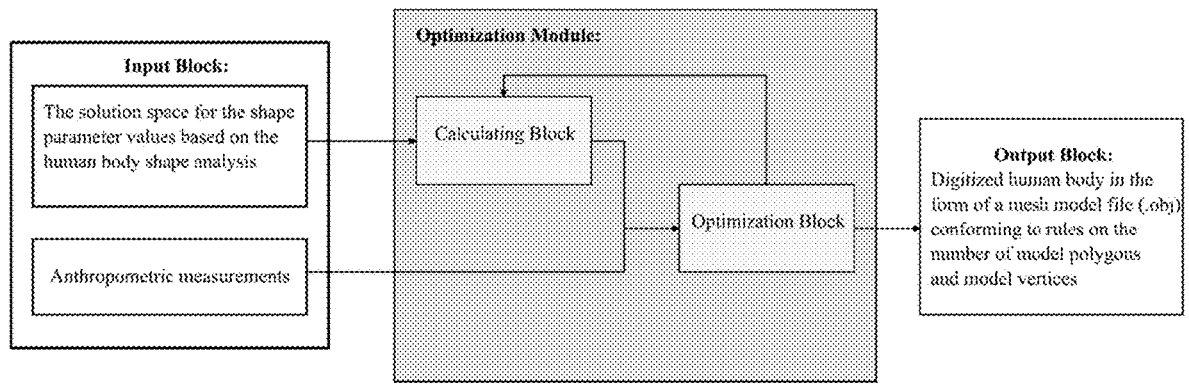
FIG. 4a is a block diagram illustrating the execution flow of the Optimization Module.

The Optimization Module, referring to FIG. 4a, uses the Genetic Algorithm to transform the parametric model into a user's model, the Optimization Module includes two main components: a Calculating Block aims to calculate measurements of the parametric model and an Optimization Block aims to optimize those measurements. In which, the former determines measurements of the 3D model, the latter transforms the parametric model into a model that is approximately identical to the digitized human body based on optimizing parameters controlling shape such that they satisfy both information of anthropometric measurements entered by the user and estimated measurements of the 3D human model.

Figure 4B:
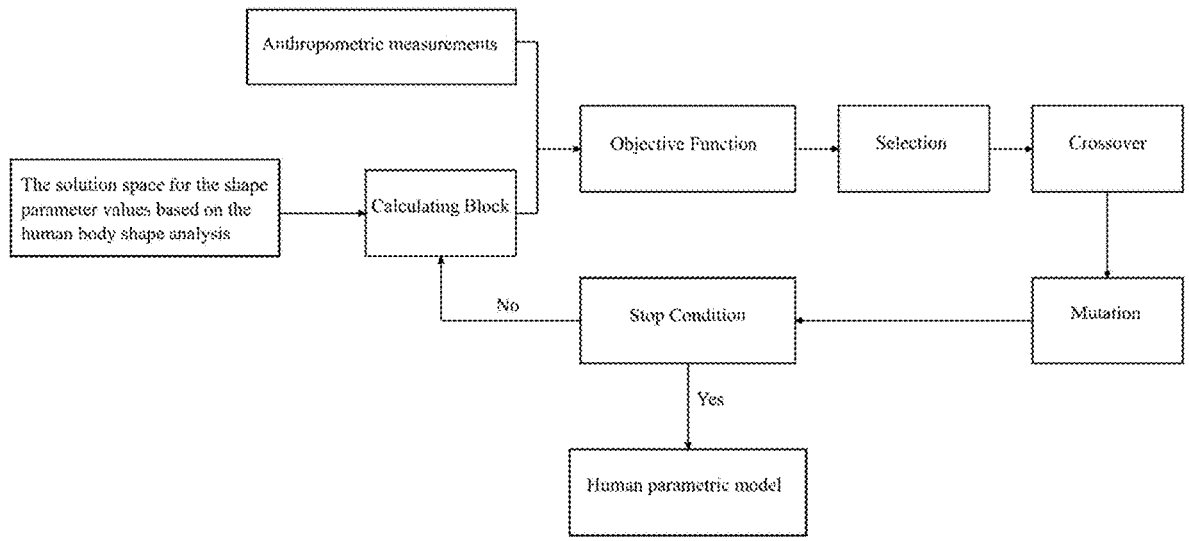
FIG. 4b illustrates the Optimization Module.

Referring to FIG. 4b, a possible solution set for a problem is initialized. Each solution would be assigned a quantitative value based on its capacity on satisfying the objective function. The most suitable individuals are determined by natural selection and reproduction to create new individuals. To find out an optimal solution, the natural selection and reproduction process are implemented iteratively in the optimization block, including four steps: (1) Selection: This process uses the Diversity Control Oriented Genetic Algorithm to select the fittest individuals from the initial population to be parents based on quantitative value; (2) Crossover: This process uses Laplace Crossover to generate a random number u following a uniform distribution and a random number v based on the Laplace distribution, these two individuals are then combined to generate an offspring which selects desirable characteristics from two old individuals; (3) Mutation: this is a process using power mutation, individuals produced after crossover step are selected according to a defined probability to perform the mutation, (4) Stop Condition: this process produces a threshold and evaluate errors resulted from implementing the three above processes, if the result is within the acceptable threshold, the 3D human model is returned and displayed on the Output Block, otherwise the Calculating Block will receive signals and continue performing the loop.

Referring to FIG. 2, besides the above modules, the 3D human reconstruction system using anthropometric measurements also employs two supplementary blocks, including:

Input Block:

The Input Block has a task for acquiring the body's measurements that are actively entered by the user. These are the main inputs for the Optimization Module to do the digitalization process.

Output Block:

The Output Block has the function of displaying final results in the obj file format according to rules of the number of model's polygons and vertices. The Output Block could be a computer screen or a projector screen.

Figure 5:
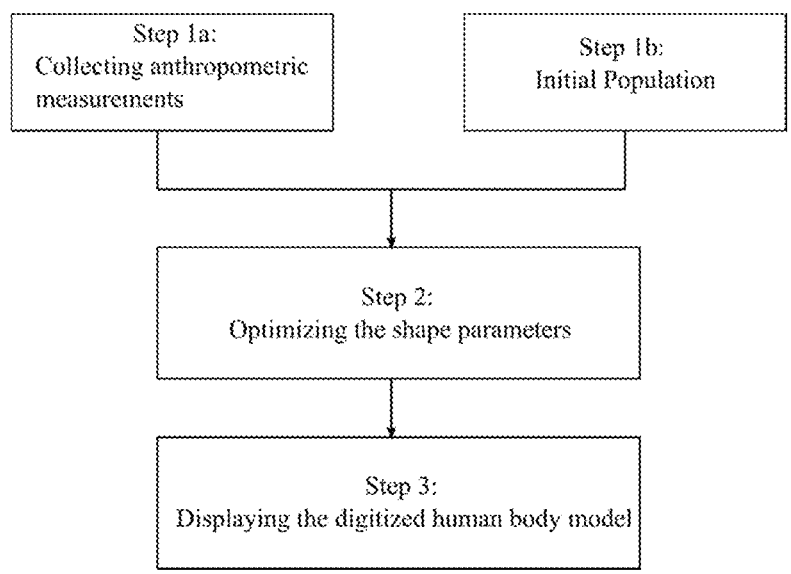
FIG. 5 is a block diagram illustrating steps in the method of reconstructing the 3D human body from anthropometric measurements.

Referring to FIG. 5, the method of reconstructing the human body using anthropometric measurements includes the following steps:

Step 1a: Collecting Anthropometric Measurements

In this step, the body's measurements entered by the user are collected and then passed to the Optimization Module in Step 2. This step is implemented in the Pre-processing Module.

Step 1b: Initial Population

In this step, the solution space for the shape parameters values of the parametric model will be selectively initialized and clustered in the Pre-processing module based on the human body analysis. Given that N is the number of individuals in a population. K-means clustering algorithm is applied to initialize the population. A large dataset of 50000 sets is generated randomly, then K-means is used to reinitialize the dataset into N clusters. The central component of each cluster will be the chromosomes of each individual in the initial population.

Step 2: Optimizing the Shape Parameters;

In this step, the Optimization Module has responsibility for combining the anthropometric measurements entered by the user in Step 1a with measurements of the parametric model determined by the Calculating Block using the clustered solution space in Step 1b to perform natural selection and reproduction process. In particular:

Process 1: Natural Selection

Natural selection is a process of selecting N individuals from the new population which are produced after each generation so that these individuals could mate and recombine to create off-springs for the next generation. This process focuses on naturally selecting to improve the diversity in the population after each generation, including three steps:

Step 2.1: Eliminating "duplicate individuals" in the population. Two individuals are evaluated as "duplicates" when the difference of gene between their two corresponding chromosomes is smaller than a defined value.

Step 2.2: Individuals are arranged in descending order of the evaluation function value. The evaluation function is created based on the loss function L between y—the input parameter of measurements and ŷ—the estimated parameter of measurements which is defined from the chromosomes of an individual. After arranging, the first individual is selected and the next ones are selected with probability p.

Step 2.3: If the number of selected individuals after Step 2.2 is smaller than N, randomly generates the remaining individuals.

Process 2: Reproduction

Reproduction is a process of producing new individuals from old individuals in the population, including two sub-processes: crossover and mutation.

a) Crossover

Laplace Crossover (LX) uses Laplace distribution to randomly generate two new individuals.

b) Mutation

A new individual generated after crossover is mutated in mutation process with a random probability $p_m$. The authors uses power mutation (PM) for an individual as follows: randomly generating variant r∈[0,1] following the uniform distribution, randomly generating variant s following power mutation with the parameter p of the distribution, p is customized so that the larger the p is, the more diverse the new individual created after the mutation process is.

The value after mutation will be evaluated by comparing with a given threshold value, if satisfied, moving to Step 3, if not, returning to Step 2.

Step 3: Displaying the Digitized Human Body Model;

This step is implemented on the Output Block, the digitized human body model is displayed on devices such as computers, projectors, ending the digitizing process of the human body under clothing and completing the stated purpose.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A system for reconstructing a 3D human body, comprising:
   an Input Block for collecting anthropometric measurements entered by a user, these measurements are an input for an Optimization Module to process a 3D human reconstruction;
   a Pre-processing Module for applying machine learning methods and anthropometrical researches to define a dataset of a parametric model with different types of shape based on a parametric model of 3D human body shape; said Pre-processing Module includes two main blocks: a Data Generating Block; a Data Clustering Block;
   said Optimization Module for transforming said parametric model based on the user's measurements into a model that approximates the user's body; said Optimization Module includes two main blocks: a Calculating Block: determining measurements of the parametric model of 3D human body shape; and an Optimizing Block: using a Genetic Algorithm to transform the parametric model of 3D human body shape to the model that approximates the user's body; and
   an Output Block for displaying a final result in a form of a mesh model (.obj) following a standard of vertex and face number.

2. The system of claim 1, in which said Pre-processing Module includes two blocks:
   said Data Generating Block uses said parametric model of the human body for providing randomly generated data with shape parameter values in the range of [−3;3] to ensure shape in nature create the solution space for optimizing a real model;
   said Data Clustering Block separates the randomly generated data into clusters of models which are anthropometrically identical, used as input anthropometric measurements to said Optimization Module.

3. The system of claim 1, in which said Optimization Module include two blocks:
   said Calculating Block: determining measurements of said parametric model so that they are equivalent to positions of the anthropometric measurements entered by the user;
   said Optimizing Block, including the following steps:
      Selection: Using a Diversity Control Oriented Genetic Algorithm, fittest individuals are selected to be parents based on quantitative values,
      Crossover: Using Laplace to generate a random number u following a uniform distribution and a random number v based on a Laplace distribution, these two individuals are combined to generate an offspring that selects desirable characteristics from two old individuals;

Mutation: Using the Power Mutation, individuals generated after the crossover step are selected according to a defined probability to perform the mutation;

Guarantee errors: producing an acceptable threshold and evaluating errors resulted from implementing the three above steps, if the result is within an acceptable threshold, the 3D human model is returned and displayed on said Output Block, otherwise said Calculating Block will receive signals and continue performing a loop.

4. A method for reconstructing a 3D human body, including four steps:

Step 1a: Collecting anthropometric measurements: collecting body's measurements entered by a user at an Input Block, These measurements are then passed to an Optimization Module in Step 2, wherein Step 1a is implemented on a Pre-processing Module;

Step 1b: Initial Population: At this step, a solution space for shape parameter values of a parametric model will be selectively initialized and clustered in said Pre-processing Module based on an analysis of the human body shape; given that N is a number of individuals in a population, K-means clustering algorithm is applied to initialize the population, A large dataset of 50000 sets is generated randomly, then K-means is used to reinitialize the dataset into N clusters, The central component of each cluster will be chromosomes of each individual in the initial population;

Step 2: Optimizing shape parameters for parametric model; in this step, body's measurements entered by the user in Step 1a together with shape data clustered in Step 1b are used to calculate a target quantitative value, these values are then selected to improve the diversity of the population; next, crossover is used to generate new values (new individuals), each value (each individual) will be processed with power mutation based on a random probability to ensure a value diversity, the value after being mutated will be compared and evaluated with a given threshold value, if satisfied, moving to Step 3, if not, returning to Step 2; and Step 3: displaying the digitized human body model; in this step, the digitized human body model is displayed on a display device, ending digitalizing process of the human body under clothing and completing the stated purpose.

\* \* \* \* \*